United States Patent

[11] 3,626,102

[72] Inventor Robert J. Cameron
Winnipeg, Manitoba, Canada
[21] Appl. No. 770,605
[22] Filed Oct. 25, 1968
[45] Patented Dec. 7, 1971
[73] Assignee Leonard P. Keg
Winnipeg, Manitoba, Canada
a part interest

[54] ELECTRONIC CIRCUITRY FOR A TELEPHONE MONITORED ALARM SYSTEM
6 Claims, 2 Drawing Figs.

[52] U.S. Cl. .......... 179/5 P
[51] Int. Cl. .......... H04m 11/04
[50] Field of Search .......... 179/5, 5 P, 2 R, 1 VS; 325/152

[56] References Cited
UNITED STATES PATENTS

| | | | |
|---|---|---|---|
| 2,575,358 | 11/1951 | Nuckolls | 179/1 VS |
| 3,360,777 | 12/1967 | Kolm | 179/2 R |
| 3,365,675 | 1/1968 | Gaddy et al. | 325/152 |
| 3,427,402 | 2/1969 | Stokes | 179/5 P |
| 3,461,241 | 8/1969 | Menke | 179/5 P |
| 2,847,507 | 8/1958 | Stradley | 179/5 P |
| 3,482,045 | 12/1969 | Chase | 179/5 P |

FOREIGN PATENTS

| | | | |
|---|---|---|---|
| 997,744 | 7/1965 | Great Britain | 179/5 P |

*Primary Examiner*—Kathleen H. Claffy
*Assistant Examiner*—David L. Stewart
*Attorney*—Merchant & Gould

ABSTRACT: Electronic circuitry including a tape recorder and condition-responsive means, such as burglar alarms, fire alarms, etc., adapted to be connected to telephone lines and a suitable source of power for automatically dialing and providing a voice message at a remote telephone upon the occurrence of a condition and for resetting the system upon receipt of a return call, as well as notifying the caller that the system is reset.

PATENTED DEC 7 1971 3,626,102

INVENTOR
Robert J. Cameron
BY
Merchant & Gould
ATTORNEYS

PATENTED DEC 7 1971 3,626,102

SHEET 2 OF 2

INVENTOR.
Robert J Cameron
BY
Merchant & Gould
ATTORNEYS

ELECTRONIC CIRCUITRY FOR A TELEPHONE MONITORED ALARM SYSTEM

BACKGROUND OF THE INVENTION

1. Field of the Invention

Alarm systems are presently being utilized in commercial and private buildings to indicate the occurrence of a variety of events, such as burglary, fire, freezing, and many other emergency occurrences. In general these alarm systems include apparatus for dialing a telephone and tape recorders with prerecorded voice messages thereon to transmit to a remote station information as to the type of emergency and the location of the building, etc.

2. Description of the Prior Art

In the prior art alarm systems the dialing mechanism is generally complicated and constructed so as to render the telephone instrument unsuitable for other purposes. Also, many of the prior art devices must be reset manually at the system. In addition to the above the prior art systems are generally extremely complicated and difficult to operate as well as expensive to manufacture and install.

SUMMARY OF THE INVENTION

The present invention pertains to electronic circuitry for a telephone-monitored alarm system including means for connecting a source of power to the motor of a tape recorder upon the actuation of a sensor and the output of the tape recorder to telephone lines, means for converting signals from the output of the tape recorder to DC dialing pulses on the telephone line and for producing a hang-up condition after a recorded voice message is transitted to the remote telephone, and means for resetting the circuitry automatically upon the receipt of a return message signal from the telephone lines.

It is an object of the present invention to provide a new and improved telephone-monitored alarm system.

It is a further object of the present invention to provide a new and improved alarm system which can be automatically reset from a remote telephone.

It is a further object of the present invention to provide an alarm system which can be utilized to automatically monitor sounds in a building from a remote telephone.

It is a further object of the present invention to provide an alarm system which is simple and inexpensive.

These and other objects of this invention will become apparent to those skilled in the art upon consideration of the accompanying specification, claims, and drawings.

DESCRIPTION OF THE PREFERRED EMBODIMENT

Figure 1:
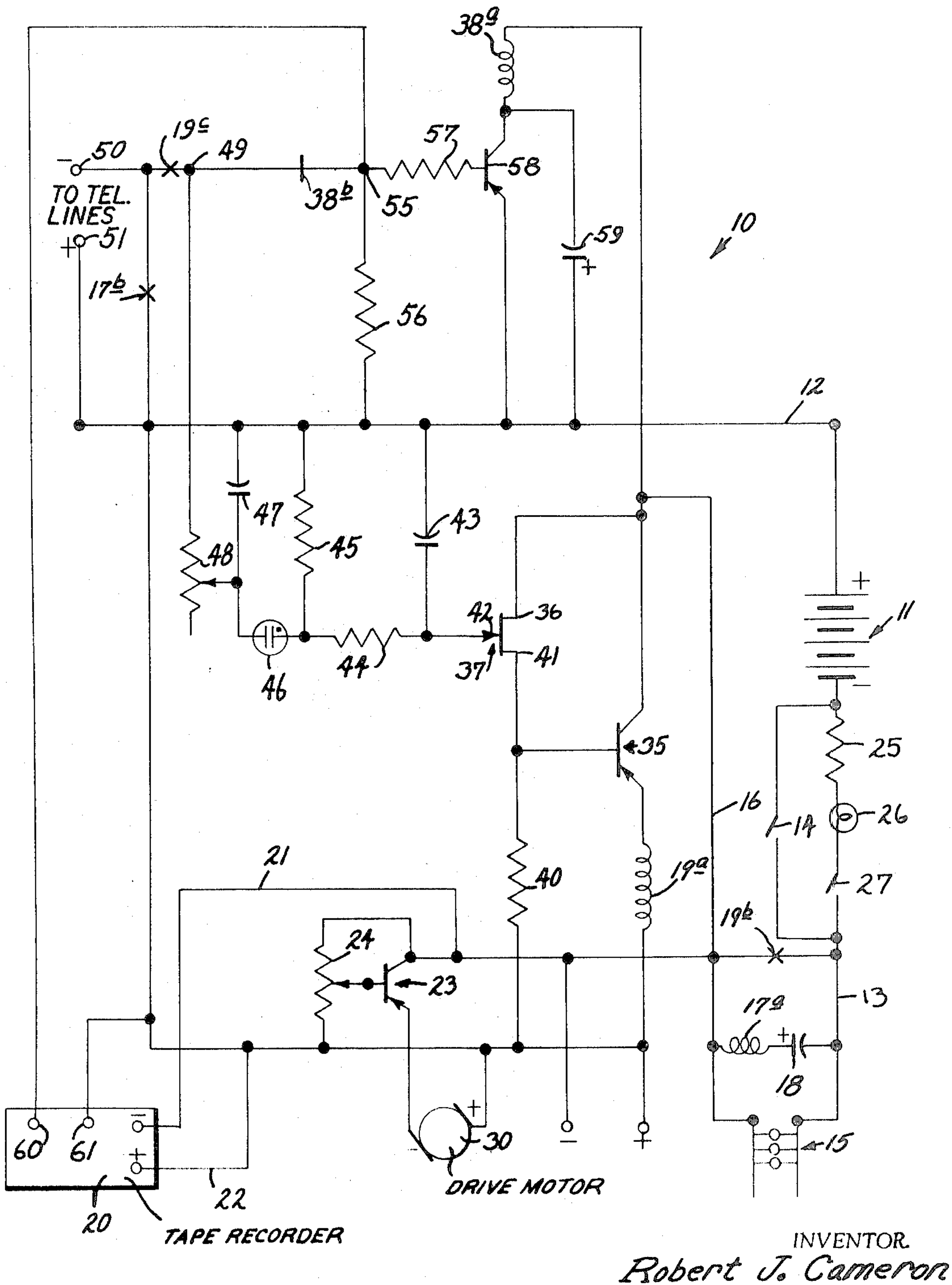
FIG. 1 is a schematic diagram of the electronic circuitry for a telephone monitored alarm system, illustrating portions of the apparatus in block form.

In FIG. 1 the electronic circuitry is generally designated 10 and includes a suitable source of electrical power, which in this embodiment is a battery 11. The positive terminal of the battery 11 is connected to a line 12 and the negative terminal is connected through an energization switch 14, which may be operated by a key, or the like, to a line 13. One side of a plurality of parallel connected sensors 15 is connected to the line 13. The other side of the parallel connected sensors 15 is connected to a line 16. A test circuit, including a resistor 25, a lamp 26 and a pushbutton switch 27 connected in series, is connected in parallel with the switch 14 and indicates the operation of a sensor 15 if the lamp 26 lights when the pushbutton switch 27 is closed. Thus, the test circuit provides an indication that all windows, doors, etc., monitored by sensor 15, are closed. One side of a relay coil 17*a* is connected to the line 16 and the other side is connected to one side of a capacitor 18, the other side of which is connected to the line 13. A set of normally open contacts 19*b*, associated with a relay coil 19*a*, are connected between the lines 13 and 16.

The line 16 is connected to the negative terminal of a tape recorder 20 by means of a line 21, which serves as the negative powerline for the electronics in the tape recorder 20. A line 22 connects the line 12 to a positive terminal of the tape recorder 20 and serves as the positive powerline for the electronics therein. The line 16 is also connected to the collector of a transistor 23, which collector is connected to one side of a potentiometer 24. The other side of the potentiometer 24 is connected to the line 12 and the variable tap is connected to the base of the transistor 23. The emitter of the transistor 23 is connected to the negative terminal of a drive motor 30 for the tape recorder 20. The positive terminal of the drive motor 30 is connected to the line 12. In addition, the line 16 is connected to the collector of a transistor 35, the source 36 of a field effect transistor 37, and one side of a relay coil 38*a*.

The emitter of the transistor 35 is connected through the coil 19*a* to the line 12. The base of the transistor 35 is connected to the drain 41 of the field-effect transistor 37 and through a resistor 40 to the line 12. The gate 42 of the field-effect transistor 37 is connected to one side of a capacitor 43, the other side of which is connected to the line 12, and one side of a resistor 44. The other side of the resistor 44 is connected to one side of a resistor 45 and to one side of a neon lamp 46. The other side of the resistor 45 is connected to the line 12. The other side of the neon lamp 46 is connected to one side of a capacitor 47, the other side of which is connected to the line 12, and to the variable contact of a potentiometer 48. One side of the potentiometer 48 is unconnected and the other side is connected to a junction 49.

A pair of terminals 50 and 51 are adapted to be connected to a set of out-going telephone lines (not shown) negative and positive, respectively. The terminal 50 is connected through a normally open set of relay contacts 19*c*, associated with the relay coil 19*a*, to the junction 49. The terminal 51 is connected to the line 12. A normally open set of relay contacts 17*b*, associated with the relay coil 17*a*, are connected between the terminals 50 and 51. A normally closed set of relay contacts 38*b*, associated with the relay coil 38*a*, are connected between the junction 49 and a junction 55. A load resistor 56 is connected from the junction 55 to the line 12. A current limiting resistor 57 is connected from the junction 55 to the base of a transistor 58. The collector of the transistor 58 is connected to the side of the relay coil 38*a* opposite the side connected to the line 16. The collector of the transistor 58 is also connected through a capacitor 59 to the line 12. The emitter of the transistor 58 is connected directly to the line 12.

The tape recorder 20 has a pair of output terminals 60 and 61 with the terminal 60 connected to the junction 55 and the terminal 61 connected to the line 12 so that the output of the tape recorder 20 is impressed directly across the load resistor 56. The load resistor 56 is connected across the telephone line at the terminals 50 and 51 through the normally closed set of contacts 38*b* and the normally open set of contacts 19*c* when the coil 19*a* is energized. When one of the sensors 15 operates a short is produced between the lines 13 and 16, whereby, the collector of the transistor 35 is connected to the negative side of the battery. Thus, the transistor 35 and the field effect transistor 37 begin to conduct. Conduction of the transistor 35 energizes the coil 19*a* and closes the two sets of contacts associated therewith, 19*b* and 19*c*. Closing the contacts 19*c* places the load resistor 56 across the terminals 50 and 51, as previously explained. Closing the contacts 19*b* produces a short between the lines 13 and 16, in addition to the shorted sensor 15, and locks the transistor 35 and the coil 19*a* in the energized position even though the sensor 15 opens.

In addition to energizing the transistor 35 and the coil 19*a*, providing a current path between the lines 13 and 16 completes a current path to the negative terminal of the tape recorder 20, whereby the electronics therein is energized, and completes a current path to the collector of the transistor 23. When the negative side of the battery 11 is connected to the collector of the transistor 23, conduction therein begins, which energizes the drive motor 30. The amount of conduction through the transistor 23 is adjusted by the potentiometer 24, which is a tape motor speed control. Thus, when one of the sensors 15 is closed by the occurrence of a condition, such as burglar, fire, etc., the tape recorder 20 is energized, including the drive motor 30, and the recorded message therein is applied to the terminals 50 and 51 at the telephone line by means of the load resistor 56.

In general, the tape recorder 20 is of the continuous tape type so that the message recorded thereon can be replayed as often as desired without rewinding the tape, etc. The recorded message includes, first a series of pulses formed by sequentially interrupting a one thousand cycle signal. In general, the pulses will be of approximately 33 milliseconds duration and will be repeated approximately 10 times per second. The number of pulses in a particular series represents a particular digit being dialed at the other end of the telephone line. The amplitude of the pulses is such that sufficient current flows through the resistor 57 into the base of the transistor 58 to cause conduction thereof. When the transistor 58 conducts the coil **38*a* is energized and the set of contacts 38*b* associated therewith open. Thus, each time a pulse in the train of pulses causes transistor 58 to conduct the telephone line is disconnected from the load resistor 56**.

Once the normally open set of contacts **19*b* close and connect the load resistor 56 between the terminals 50 and 51, an "off the hook" condition is produced in the telephone line and telephone current flows from the telephone line through the load resistor 56 and the secondary of a transformer (not shown) in the output of the tape recorder 20, if one is present. When the normally closed set of contacts 38*b* open and close in correspondence with the series of pulses recorded in the tape recorder 20**, the telephone current flowing in the telephone line is interrupted in a fashion somewhat similar to the dialing of a telephone instrument. This interrupting of the telephone current produces DC pulses on the telephone line which cause the automatic equipment in the telephone exchange to ring the desired remote telephone.

Also included in the recorded message on the tape recorder 20 in a voice message which may be repeated several times. This message will impart the desired information to a person at the remote telephone, such as the nature of the problem and the address, etc. The amplitude of the voice message is insufficient to cause conduction of the transistor 58 so that the set of contacts **38*b* remain closed. At the end of the voice message a pulse formed from a 1000-cycle signal having approximately a 30-second duration and a sufficiently high amplitude to cause conduction of the transistor 58, is recorded. This 30-second pulse causes the set of contacts 38*b*** to open and produce a "hang-up" condition of the system which automatically disconnects the remote telephone.

The person at the remote telephone, may, if he wishes, dial the number of the phone to which the monitored alarm system is connected. If the person dials after the 30-second hang-up condition, he will receive a busy signal because the load resistor 56 will be connected across the telephone lines and another sequence of dialing will begin. If the person dials during the 30-second hang-up condition the load resistor 56 is disconnected from the telephone lines and the system is available to receive a call. The ringing signal is then applied across the potentiometer 48 and the capacitor 47, which operate as a low pass filter and remove inductive voltage pulses, etc. The ringing signal is approximately 90 volts at 20 cycles per second and is superimposed upon the DC line current of the telephone, which is approximately 48 volts. The neon lamp 46, which requires approximately 90 volts to fire, and the resistor 45 operate somewhat as a symmetrical clamping circuit to deliver a sufficient DC voltage to the gate 42 of the field-effect transistor 37 to cause it to conduct. The recorded dialing pulses are of insufficient magnitude to fire the neon lamp 46 and are blocked from the gate of the field effect transistor 37. The resistor 44 and capacitor 43 provide additional filtering and introduce a delay of approximately one second to insure the completion of the dialing at the remote telephone instrument. The resistor 44 is a current limiting resistor which supplies a portion of the signal to the gate 42 of the field effect transistor 37. The capacitor 43 is a second filter capacitor to aid in removing any inductive voltage pulses and the like. The sizes of the capacitor 43, resistor 44, capacitor 47 and potentiometer 48 are adjusted to prevent the recorded dialing pulses from passing therethrough while allowing ringing signals from the telephone exchange to pass therethrough.

When the ringing signal from the exchange is supplied to the gate 42 of the field-effect transistor 37, the transistor 37 stops conducting and the voltage drop across the resistor 40 is lowered sufficiently to stop conduction of the transistor 35. Stopping the conduction of the transistor 35 deenergizes the coil **19*a* and the two sets of contacts 19*b* and 19*c* open, resetting the system. Upon the opening of the contacts 19*b* a momentary current flows through the relay coil 17*a* to charge the capacitor 18. This momentary current energizes the coil 17*a* causing the set of contacts 17*b* to close and produce an indication of an answer at the remote telephone. Once the capacitor 18 is charged sufficiently the current no longer energizes coil 17*a* and the set of contacts 17*b*** open leaving the system reset. If the party calling the number of the unit does not hang up he can tell if the alarm is still triggering the system, because he will hear the system begin the dialing procedure.

Figure 2:
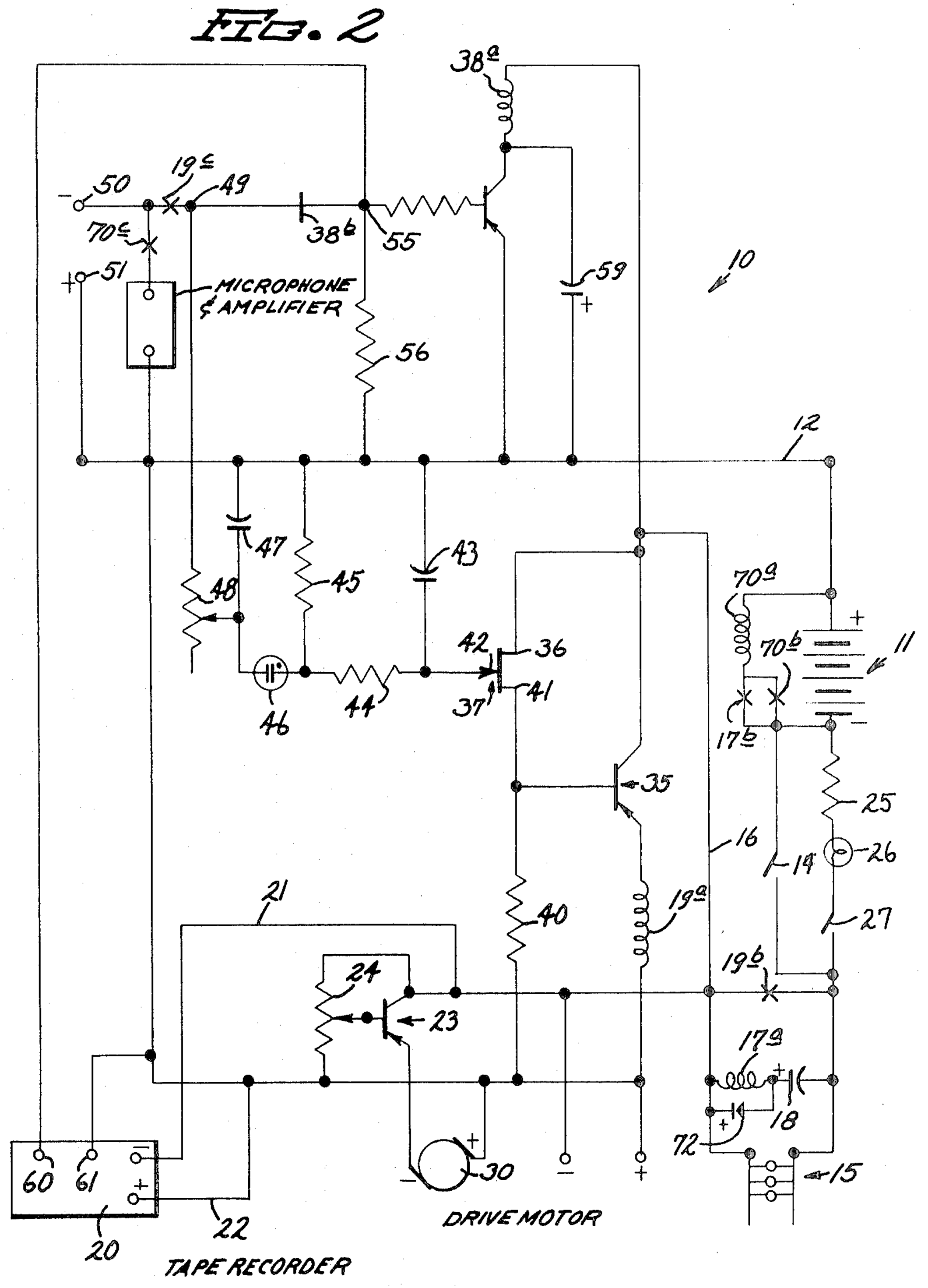
FIG. 2 is a schematic diagram similar to FIG. 1 illustrating a somewhat different embodiment.

Referring to FIG. 2 a somewhat different embodiment is disclosed wherein similar components are designated with similar numerals and the operation thereof remains the same as previously described. A series connection of a relay coil **70*a* are connected in parallel with the battery 11. Also, the set of contacts 17*b* are disconnected from between the terminals 50 and 51 and are connected in parallel with the set of contacts 70*b*. A second set of contacts 70*c*, associated with the relay coil 70*a*, are connected in series with the output of an amplifier 71, having a microphone input, between the terminals 50 and 51. Thus, when the person at the remote telephone dials the number of the alarm system and the relay coil 17*a* is momentarily energized, the set of contacts 17*b* close, completing a circuit through the relay coil 70*a*. When the relay coil 70*a* is energized the set of contacts 70*b* close to lock the relay coil 70*a* in the energized position. The set of contacts 70*c* also close, connecting the output of the amplifier 71 across the telephone lines. The input of the amplifier 71 is a microphone, so the person at the remote telephone can hear any sounds in the building housing the system. Thus, an indication of the type of emergency will be received and whether it might be a false alarm. A diode 72 is connected in parallel with the relay coil 17*a* to prevent the relay coil 17*a* from being energized when the circuitry 10 is energized. If relay coil 17*a* were energized relay coil 70*a* would lock in the energized mode and place the amplifier 71 across the telephone line, terminals 50–51**, during dialing.

Thus, a telephone-monitored alarm system is disclosed which is simple to install and operate and which is relatively inexpensive to manufacture. Further, the alarm system is capable of ringing any remote telephone unit and notifying a person answering that unit of the existing emergency, address, etc. The present alarm system can be reset from the remote unit and, assuming the sensor 15 is not continuously operating, will be ready for the next emergency. Thus, the person answering the remote unit can determine from his remote position whether or not the sensor 15 is operating continuously.

What is claimed is:

1. A telephone-monitored alarm system adapted to be connected to a suitable source of electrical power and telephone lines comprising:

a. a tape recorder having a drive motor and an electrical output;

b. condition-responsive means constructed to operate upon the occurrence of a predetermined condition;

c. electronic circuitry operatively connected to said tape recorder and said condition-responsive means and adapted to be connected to said source of electrical power and said telephone lines including
1. first switching means having a normal state, wherein said tape recorder output and said telephone lines are disconnected and said source of electrical power and said drive motor are disconnected, and being connected to complete a circuit between said tape recorder output and said telephone lines and between said source of electrical power and said drive motor upon the operation of said condition-responsive means,
2. second switching means being connected to sequentially interrupt the circuit between said tape recorder output and said telephone line s in accordance with recorded signals from said tape recorder output for producing dialing signals on said telephone lines and for temporarily interrupting said telephone lines at the end of a recorded voice message from said tape recorder to produce a hang-up condition, and
d. third switching means including a semiconductor switch and an electrical circuit having a gas fired lamp therein being connected for receiving a ringing signal from the telephone lines, passing only the ringing signal to the semiconductor switch and resetting the circuitry to the normal state.

2. A telephone-monitored alarm system as set forth in claim 1 wherein the first switching means includes a relay having two sets of normally open contacts one set of which is connected as a locking circuit for maintaining the relay energized upon receipt of an initial energization current.

3. A telephone-monitored alarm system as set forth in claim 1 wherein load resistance means are placed across the telephone lines, to simulate an off the hook condition, and across the tape recorder output, to apply signals therefrom to the telephone lines, and the second switching means includes a relay having a coil connected to be energized by predetermined pulses of current through said load resistance means and a normally closed set of contacts positioned between at least one of the telephone lines and the load resistance for opening the telephone lines upon energization of the coil.

4. A telephone-monitored alarm system as set forth in claim 2 wherein the third switching means includes circuitry sensitive to incoming signals on the telephone lines and connected to remove electrical power from the relay of the first switching means allowing the locking circuit and the relay means to return to a normally deenergized state.

5. A telephone-monitored alarm system as set forth in claim 1 having in addition a fourth switching means and microphone means for operatively connecting the microphone means to the telephone lines by way of the fourth switching means upon operation of the third switching means.

6. A telephone-monitored alarm system adapted to be connected to a suitable source of electrical power and telephone lines comprising:
a. a tape recorder having a drive motor and an electrical output;
b. condition-responsive means constructed to operate upon the occurrence of a predetermined condition;
c. electronic circuitry operatively connected to said tape recorder and said condition-responsive means and adapted to be connected to said source of electrical power and said telephone lines including
1. first switching means having a normal state, wherein said tape recorder output and said telephone lines are disconnected and said source of electrical power and said drive motor are disconnected, and being connected to complete a circuit between said tape recorder output and said telephone lines and between said source of electrical power and said drive motor upon the operation of said condition-responsive means,
2. second switching means being connected to sequentially interrupt the circuit between said tape recorder output and said telephone lines in accordance with recorded signals from said tape recorder output for producing dialing signals on said telephone lines and for temporarily interrupting said telephone lines at the end of a recorded voice message from said tape recorder to produce a hang-up condition,
3. third switching means being connected for receiving a ringing signal from the telephone lines and resetting the circuit to the normal state, and
4. a fourth switching means for providing a substantially short circuit across the telephone lines upon the system being reset for providing an indication to a remote telephone unit that the system has been reset.

* * * * *